United States Patent [19]

Kiener

[11] 4,142,867

[45] Mar. 6, 1979

[54] APPARATUS FOR THE PRODUCTION OF COMBUSTIBLE GAS

[76] Inventor: Karl Kiener, 7081 Goldshofe, Ostalbkreis, Fed. Rep. of Germany

[21] Appl. No.: 727,053

[22] Filed: Sep. 27, 1976

Related U.S. Application Data

[62] Division of Ser. No. 590,715, Jun. 26, 1975, Pat. No. 4,028,068.

[30] Foreign Application Priority Data

Jul. 4, 1974 [DE] Fed. Rep. of Germany ....... 2432504

[51] Int. Cl.² ............................................. C10J 3/20
[52] U.S. Cl. .......................................... 48/76; 48/111; 202/87; 202/100; 202/216; 202/218
[58] Field of Search ................... 48/197 R, 202, 203, 48/206, 207, 209, 210, 211, 212, 61, 62 R, 76, 77, 89, 101, 111, 90, 113; 202/130, 249, 85, 86, 87, 88, 90, 100, 108, 113, 131, 216, 218

[56] References Cited

U.S. PATENT DOCUMENTS

| | | | |
|---|---|---|---|
| 1,400,885 | 12/1921 | Koster | 48/69 |
| 1,413,799 | 4/1922 | Smith | 48/202 |
| 1,614,220 | 1/1927 | Wendel | 202/136 |
| 1,821,263 | 9/1931 | Imbert | 48/76 |
| 1,849,279 | 3/1932 | Cezanne | 48/76 |
| 2,511,709 | 6/1950 | Hemminger | 202/216 |
| 2,623,815 | 12/1952 | Roetheli et al. | 48/202 |
| 3,020,715 | 2/1962 | Thomsen | 48/210 |
| 3,398,058 | 8/1968 | Campbell | 48/210 |
| 3,761,568 | 9/1973 | Brink et al. | 48/197 R |

*Primary Examiner*—S. Leon Bashore
*Assistant Examiner*—Peter F. Kratz
*Attorney, Agent, or Firm*—Carroll F. Palmer

[57] ABSTRACT

An apparatus for the production of combustible gas from waste materials and other combustible materials, in which the charge is dried, its combustible parts are subjected to low-temperature carbonization and the low-temperature carbonization gases are converted to combustible gas in a hot reaction bed. The charge is subjected to low-temperature carbonization at a temperature of from 300° to 600° C. with the exclusion of air, the resulting solid low-temperature carbonization residues are separated and the low-temperature carbonization gases are continuously drawn through a reaction bed at a temperature of from 1000° to 1200° C. formed from a solid carbon vehicle and a preheated fresh-air supply, and are converted to high-energy combustible gas in said reaction bed.

10 Claims, 4 Drawing Figures

APPARATUS FOR THE PRODUCTION OF COMBUSTIBLE GAS

CROSS REFERENCE TO RELATED APPLICATION

This is a division of application Ser. No. 570,715, filed June 26, 1975, now U.S. Pat. No. 4,028,068.

BACKGROUND OF THE INVENTION

Field of the Invention

This invention relates to a process and apparatus for the production of combustible gas from waste substances and other combustible materials which, because of their composition, e.g. their water content or pollutant combustion residues, have an adverse effect on, or are unsuitable for, direct incineration, e.g. domestic and industrial refuse, used oil and petroleum, wood and wood waste, lignite, peat and other organic substances, rubber, plastics and so on.

DESCRIPTION OF THE PRIOR ART

A number of different processes have been disclosed for the utilisation of waste substances and other such materials, wherein the predried charge is burnt at temperatures far above 1000° C. in rotary kilns, shaft furnaces or the like, the resulting heat being used predominantly for steam generation or for central heating.

Known plants for the incineration or gasification of refuse or other waste substances have a number of disadvantages. The waste gases forming in large quantities because of the large excess of air must be purified, and this is an expensive business which is nevertheless only incomplete despite expensive filter and scrubbing plants. Re-usable constituents, such as scrap iron and non-ferrous metal, are lost because of the high process temperature of above 1000° C. The resulting slag consisting of ash and broken glass, together with the included salts, may pollute groundwater or other effluents. The resulting heat is in the form of steam, which can be used only to a limited degree.

Processes for the production of a combustible gas from waste substances and other carbon-containing materials which are unsuitable or only inadequately suitable for direct combustion have long been known. In one method of this kind (Austrian Patent Spec. No. 44467) the waste is burnt in a shaft furnace and for oxygen enrichment purposes the escaping gases are passed through another furnace filled with red-hot coke. Two alternately operated coke ovens are used to perform a continuous process, the waste gases escaping from whichever coke oven is being blown being fed to the combustion oven for the waste and being passed, together with the smoke or low-temperature carbonisation gases expelled from the waste, through the hot coke in the other coke oven. In this process, therefore, there is no real low-temperature carbonization of the waste substances; instead they are burned at high temperatures so that the combustion gases produced from the waste contain only small quantities of reactive constituents and the combustible gases generated have only a low heat content. A disadvantage in terms of operation is that the combustion of the waste substances at relatively high temperatures results in the loss of the re-usable substances and at these combustion temperatures the non-combustible constituents in the waste materials fuse together or sinter as a result of their sometimes low softening temperatures, and thus clog the shaft furnace.

In another known process for the production of a fuel gas free of carbon monoxide, from refuse and waste substances, with the simultaneous production of cyanogen compounds (Austrian Patent Spec. No. 1 664), the waste materials are heated to temperatures of between 800° and 1000° C. for partial conversion to smoke gases which are fed to a shaft reactor filled with reactive materials in a specific arrangement. In this shaft reactor the smoke gases are passed over hot paper ash to bring them to dissociation temperature and are passed over coke or other carbon-containing material in the dissociated state. The conversion of the smoke gases formed previously by the waste distillation takes place in these conditions. Like the first-mentioned process, this process is also unsuitable for the use of domestic or industrial waste and a number of other carbon-containing materials, because of the high gasification temperature of 800° to 1000° C., the non-combustible constituents automatically sintering together. Charging the shaft reactor with paper ash and coke in separate layers means a considerable outlay and the combustible gas obtained has only a low heat content because of the high gasification temperature at which a considerable proportion of the gases is already burnt. Other known gasification processes are described in German Patent Specs. Nos. 972 468; 672 921; 585 274; 445 334; and Austrian Patent Spec. No. 1 654 942.

A common disadvantage of all these known processes for the production of combustible gas is that the low-temperature carbonisation temperature of the materials used is about 1000° C. so that only materials having a high softening point for their non-combustible constituents can be gasified. Furthermore, in the case of domestic or industrial waste, for example, this high gasification temperature means that the oxygen reaching the gasification reactor together with the waste substances forms permanent compounds with the low-temperature carbonization gases and these compounds cannot be converted in the following reaction bed so that the combustible gas produced is of low energy and the effective conversion efficiency is low.

OBJECTS

An object of the invention is to provide a process for the production of a high-energy combustible gas from waste substances and other combustible materials which, because of their composition, e.g. their water content or pollutant combustion residues, are unsuitable for direct combustion, the resulting combustible gas being usable to drive internal combustion engines, more particularly gas turbines, the energy content of the charge being contained with a high efficiency in the generated combustible gas. The invention also has as its object to provide a cheap and operationally reliable apparatus for performing the process which operates without pollution.

SUMMARY OF THE INVENTION

According to the present invention there is provided a process for the production of combustible gas from waste materials and other combustible materials, in which the charge is dried, its combustible parts are subjected to low-temperature carbonization and the low-temperature carbonization gases are converted to combustible gas in a hot reaction bed, characterised in that the charge is subjected to low-temperature carbonization at a temperature of from 300° to 600° C. with the exclusion of air, the resulting solid low-temperature carbonization residues are separated and the low-temperature carbonization gases are continuously drawn through a reaction bed at a temperature of from 1000° to 1200° C. formed from a solid carbon vehicle and a preheated fresh-air supply, and are converted to high-energy combustible gas in said reaction bed.

In view of the relatively low carbonization temperature, which is far below the ash softening point of the various charge materials, clogging of the reactors cannot occur and the low-temperature carbonization coke and the non-reacting constituents do not cake, so that they can be processed, for example, by screening and the valuable constituents can be recovered.

With certain charge materials the low-temperature carbonization coke can be used as a carbon vehicle for the hot reaction bed. To this end, the softening point of the ash and of the non-combustible constituents must at least be above 1200° C. The low-temperature coke may be mixed with other high-grade carbon vehicles, e.g., lignite, low-temperature coke or wood charcoal.

If the non-reacting constituents of the charge have a lower softening point, the coke produced in the low-temperature carbonization reactor is fed to a processing device together with the non-carbonised products in piece form and is used for various purposes after fractionation.

Depending upon the nature of the charge, the low-temperature carbonization is controlled by controlling the supply of heat and/or water and the hot low-temperature carbonization gases from which the dust has previously been extracted are introduced, according to the invention, directly into the reaction zone at a temperature of about 1000° to 1200° C. of the reaction bed formed from a low-ash carbon vehicle having an ash softening point above the reaction temperature.

Depending upon the materials in the charge and the reactivity of the low-temperature carbonization gases, it may be advantageous to intensify the conversion to combustible gas catalytically. Suitable catalysts, inter alia, are soda and porous substances of the kind used to eliminate noxious substances in motor vehicle exhaust systems.

The process according to the invention has considerable advantages over conventional garbage incineration or gasification processes, particularly as a result of the complete absence of pollutant or dangerous waste gases or other reaction products and the high energy content of the combustible gas produced, which can be used, for example, directly as a fuel for internal combustion engines. These advantages are achieved mainly by the strict two-stage nature of the process, i.e., separate low-temperature carbonization of the charge at temperatures between 300° and 600° C., preferably between 400° and 500° C., so carried out as to vaporise the water contained in the charge and convert the low-temperature carbonisable or combustible constituents to a mixture of vapour and low-temperature carbonization gas which contains dust and possibly soot. The second important step in the process is the conversion of the hot low-temperature carbonization gases from which the dust has previously been extracted, into a high-energy combustible gas in the reaction bed, which is at a temperature of 1000° to 1200° C. and which is formed by a carbon vehicle.

The resulting low-temperature gases can be introduced into the hot reaction zone either through the carbon vehicle for the hot reaction bed or directly mixed with fresh air. The direct introduction of hot low-temperature carbonization gases from which the dust has been extracted has the advantage of avoiding reactions between the low-temperature carbonization gas and the carbon vehicle situated above the reaction bed, since such reactions might reduce efficiency and the gas yield.

The process according to the invention is suitable not only for the utilisation of waste materials of the most diverse kinds, but also for the non-pollutant production of gas from lower grade fuels, e.g. high sulphur-content oil, asphalt, tar, high-ash content coal, oil shale, oil sand, wood, wood waste of all kinds, sawdust, peat, lignite having a high ash and water content, industrial products, such as used oils, plastics, rubber, old tires, and so on. With a large number of these materials, e.g. plastics, rubber products such as old tires, cable waste etc., the low-temperature carbonization process does not result in low-temperature coke, because these materials are completely converted to low-temperature carbonization gases at the low-temperature carbonization temperature of 500° C. Since, in normal operation, the carbon vehicle in the reaction bed participates only in very small quantities in the conversion of the low-temperature carbonization gases to fuel gas and is thus hardly used up, the process according to the invention is particularly suitable for the non-pollutant elimination of such substances. In addition, the process according to the invention offers the advantageous possibility of producing not only the high-grade combustible gas but also, depending on how the low-temperature carbonization process is performed, large quantities of low-temperature coke which can be used as wood charcoal and which can be utilised commercially separately.

The optimum low-temperature carbonization of the charge is effected by appropriate control of the process, to supply the process with the amount of heat required to maintain the low-temperature carbonization temperature of about 500° C. and the quantity of water adapted to the nature of the charge. Depending upon the composition of the low-temperature carbonization gases, a varying amount of fresh air is introduced into the reaction zone of the combustible gas reactor, said quantities being so adapted to one another according to the invention that the solid low-ash carbon vehicle in the reactor participates in the conversion of the low-temperature carbonization gases to the combustible gas either not at all or else in only very small quantities of just a few percent.

The apparatus for performing the process comprises at least one low-temperature carbonization reactor with a sealed inlet conveyor, an outlet for solids and an outlet for the low-temperature carbonization gases. It also comprises a combustible gas reactor fed with the low-ash carbon vehicle to form a reaction bed to which pipes are connected for the supply of preheated fresh air to the reaction bed and at least one inlet spigot for the low-temperature carbonization gases and an outlet for the combustible gas beneath the reaction bed. A grate with a conveyor for discharging the ash formed in the reaction bed is provided in the bottom end of the combustible gas reactor. The spigot for introducing the low-temperature carbonization gases into the reactor may be disposed on that side of the reactor on which the solid carbon vehicle is introduced so that the low-temperature carbonization gases at a temperature of about 500° C. drawn into the reactor preheat the carbon vehicle. If such preheating is undesirable in order to avoid premature reactions between the low-temperature carbonization gases and the carbon vehicles, the inlet spigot for the low-temperature carbonization gases may be disposed directly in the region of the hot reaction bed in the combustible gas reactor. According to the invention, a dust extraction unit is provided in the low-temperature carbonization gas pipe between the low-temperature carbonization reactors and the combustible gas reactor. Means for controlling the low-temperature carbonization process in dependence on the nature of the charge and the quantity and composition of the generated combustible gas are operatively connected to the low-temperature carbonization reactors and the combustible gas reactor.

A particular advantage of the process according to the invention is that the effective conversion efficiency of the heat energy contained in the various substances remains at a substantially unchanged level in the combustible gas with the different variations of the complete gasification process. Only the calorific value of the combustible gas changes with respect to standard cubic meters ($m^3$ NTP). If the calorific value $m^3$ NTP is reduced, the volume of flow of combustible gas generated increases. In the case of coupling the kinetic energy producers (gas engines, gas turbines, gas-fired steam boilers), the effective conversion efficiency using the process according to the invention is 0.8 to 0.95.

BRIEF DESCRIPTION OF THE DRAWING

The invention will be described now by way of example only with particular reference to the accompanying drawing wherein.

Figure 1:
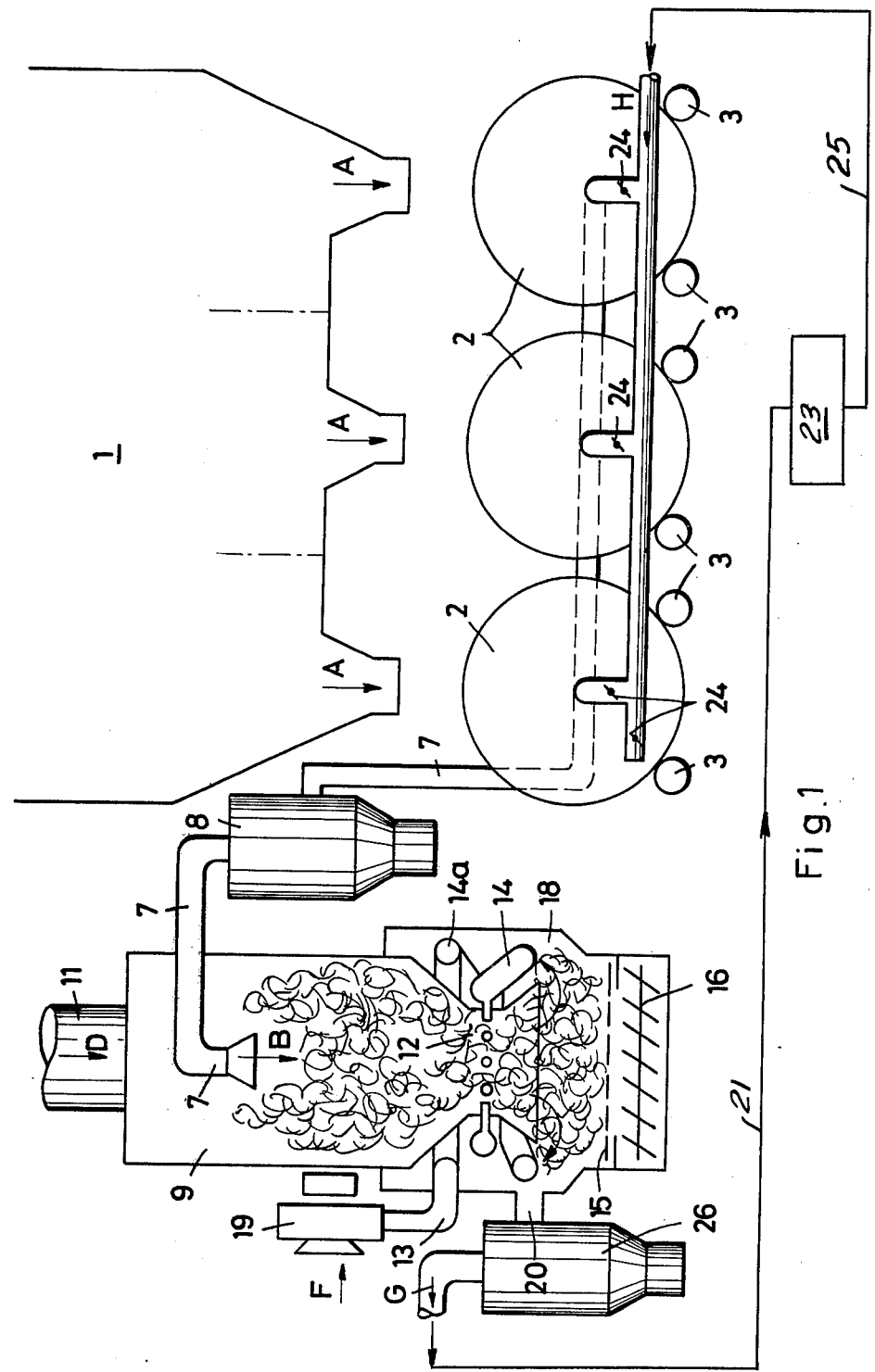
FIG. 1 is a general diagrammatic view of apparatus according to the invention.

In the plane shown in FIG. 1, the charge which, if required, may have been pre-treated in a dryer (not shown), can be kept in a bunker 1 and passes in the direction of arrow A through sealed inlets into rotary tubes 2 which are well insulated thermally and which are mounted on rollers 3 which drive them.

It is advantageous to use a plurality of such rotary tubes 2 in order to obtain continuous operation with negligible fluctuations in the gas composition. On completion of the low-temperature carbonization, the residues are removed from the first rotary tube 2 and a charge is introduced. The excess water vapour forming during the drying operation can be discharged by operating a valve 92 (see FIG. 3). After the expiry of a predetermined time, the second rotary tube 2 is heated from outside and the charge is brought to the predetermined temperature for low-temperature carbonization. The third rotary tube in the meantime produces best low-temperature carbonization gas at a maximum temperature of about 500° C.

Depending upon the nature and type of charge, the low-temperature carbonization process may be exothermic. In the low-temperature carbonization of air-dried wood, 6-8% of the calorific value is liberated as heat. If the thermal insulation is good, the low-temperature carbonization process can be maintained without heat being supplied externally. Where other materials are used as the charge, the heat evolved during the low-temperature carbonization process is just a few cal/kg (20 to 30 cal/kg), so that a heat supply is absolutely essential in this process.

To start the low-temperature carbonization reactors the charge is heated by a burner (not shown) because there is as yet no waste heat available from the combustion process. The burner may be a gas or oil burner and electrical heat is also suitable for heating purposes.

The low-temperature carbonization and smoke gases pass via a pipe 7 and a cyclone 8 to a gasification reactor 9. After complete low-temperature carbonization of the charge, the solids from the rotary tube 2 pass to a classifier and/or sorter which may, for example, be constructed as a driven grate, a screen or the like and from which the low-temperature coke (if its ash does not melt until above 1200° C.) passes in the direction of arrow D to the gasification reactor 9. A red-hot reaction bed 12 is formed in the gasification reactor 9 by means of fresh air which is introduced into the reaction bed 12 via fresh-air pipes 13, an annular chamber 14 in the gasification reactor 9 and radial pipes 14a. A grate 15 is provided in the bottom zone of the gasification reactor 9 between the annular chamber 14 and through this grate the constituents which have reacted to form ash fall into an ash chamber from which they are discharged by a feed screw 16 or some other suitable conveyor.

The low-temperature carbonization and smoke gas entering the gasification reactor 9 in the direction of arrow B flows through the hot reaction bed 12 and above the grate 15 it passes into a jacket chamber 18 which surrounds the gasification reactor 9 and in which the pipe 13 receiving fresh air in the direction of arrow F from a fan 19 is disposed in the form of a coil so that the fresh air already has a relatively high temperature when it flows into the reaction bed 12.

As they flow through the hot reaction bed 12, the low-temperature carbonization and smoke gases are converted to high-grade combustible gases by the conversion and splitting up of the moisture contained in them, and these high-grade combustible gases cool off in the jacket chamber 18 with simultaneous preheating of the fresh air. The combustible gases are forced through a pipe 20 and the cyclone cleaner 26 by a fan (not shown) and fed in the direction of arrow G to a gas scrubber and a gas cooler (not shown). Alternatively, the combustion gases may be taken by pipe 21 to an internal combustion engine 23 whose exhaust gases are led by pipe 25 for recycle to the rotary tubes 2.

The charge for low-temperature carbonization is continuously turned over by driver plates 22 as the rotary drums rotate, so that it is heated through in a short time. As soon as low-temperature carbonization starts, a positive pressure forms inside the rotary tube 2 and the low-temperature carbonization gases passes into the tube 7 via a sleeve (not shown) which is arranged to slide in sealing-tight relationship. By means of valves 24 the heat supply from the exhaust gases of the gas engine can be so controlled that the low-temperature carbonization gases are produced only in the quantity required by the gas engine at the given load.

Figure 2:
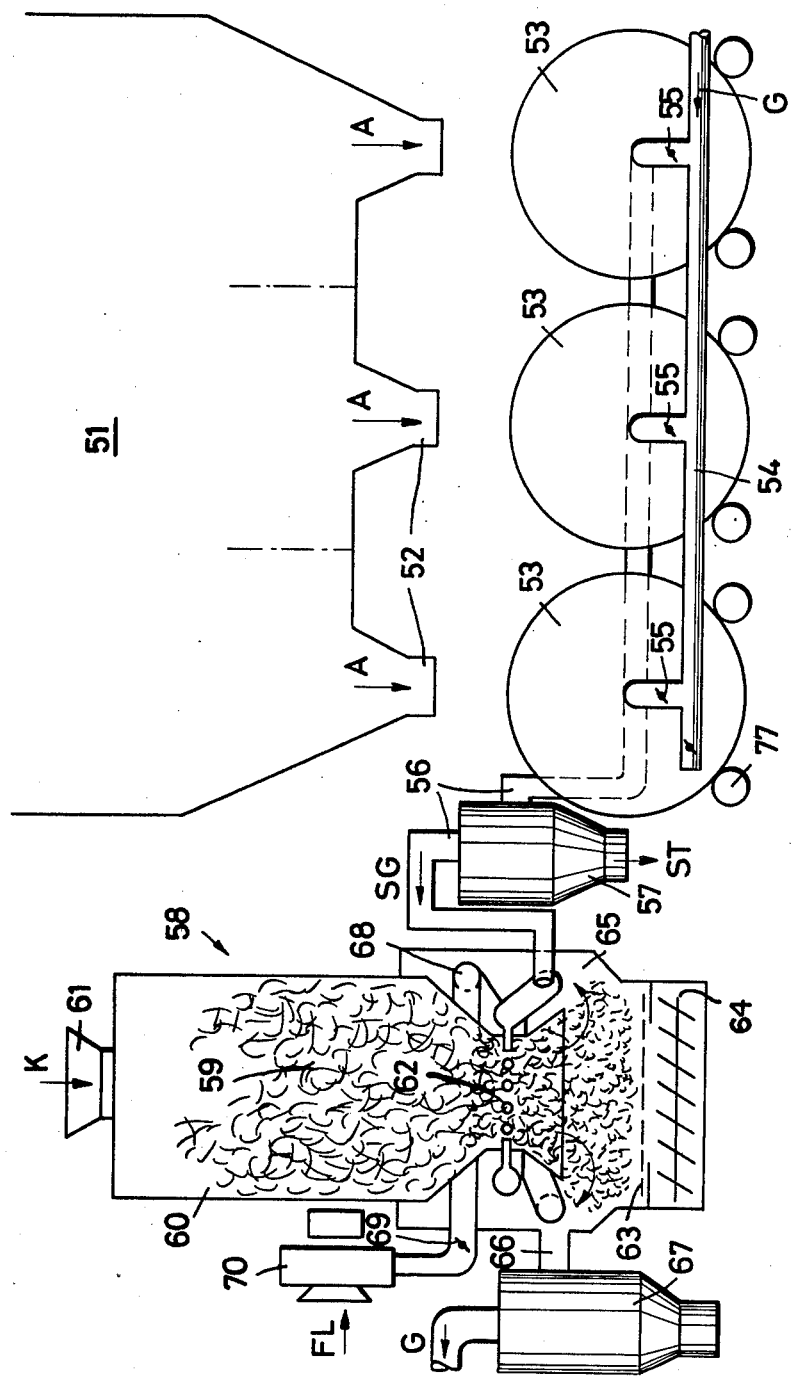
FIG. 2 is a diagram showing another construction of the apparatus according to FIG. 1.

The plant shown in FIG. 2 comprises a bunker 51 with outlets 52 which are sealed off from the external air and through which the plurality of parallel-connected low-temperature carbonization reactors 53 are fed at different times with the charge required low-temperature carbonization. These low-temperature carbonisation reactors constructed as rotary drums are connected to a combustible gas pipe 54, which will be described in detail hereinafter, via branch pipes and separate control elements 55. A low-temperature carbonization gas pipe 56 which can be connected to each gas generator extends into the combustible gas reactor 58 via a cyclone 57 designed for high-temperature operation and intended for separating the flue dust from the low-temperature carbonization gases.

The reactor 58 filled with a low-ash carbon vehicle 59 is constructed at the top in the form of a shaft 60 with an inlet 61. The actual reaction zone 62 at a temperature of about 1000° to 1200° C. is provided in the bottom part of the reactor with a conically tapering zone in which the low-temperature carbonization gases arriving at a temperature of about 500° C. are converted to the combustible gas. Beneath the reaction zone 62 is a grate 63 and a discharge conveyor 64 for discharging the ash. The combustible gas produced is withdrawn downwardly from the hot reaction bed in the direction of the arrows, into a pre-heat chamber 65 which surrounds the hot reaction zone 62 and which is connected via a pipe 66 either directly to a load (not shown), e.g. a gas internal combustion engine, or to a cyclone 67 for separating any entrained ash particles. The preheat chamber 65 contains fresh-air pipes 68 connected to a fresh-air fan 70 via a throttle valve 69.

Figure 3:
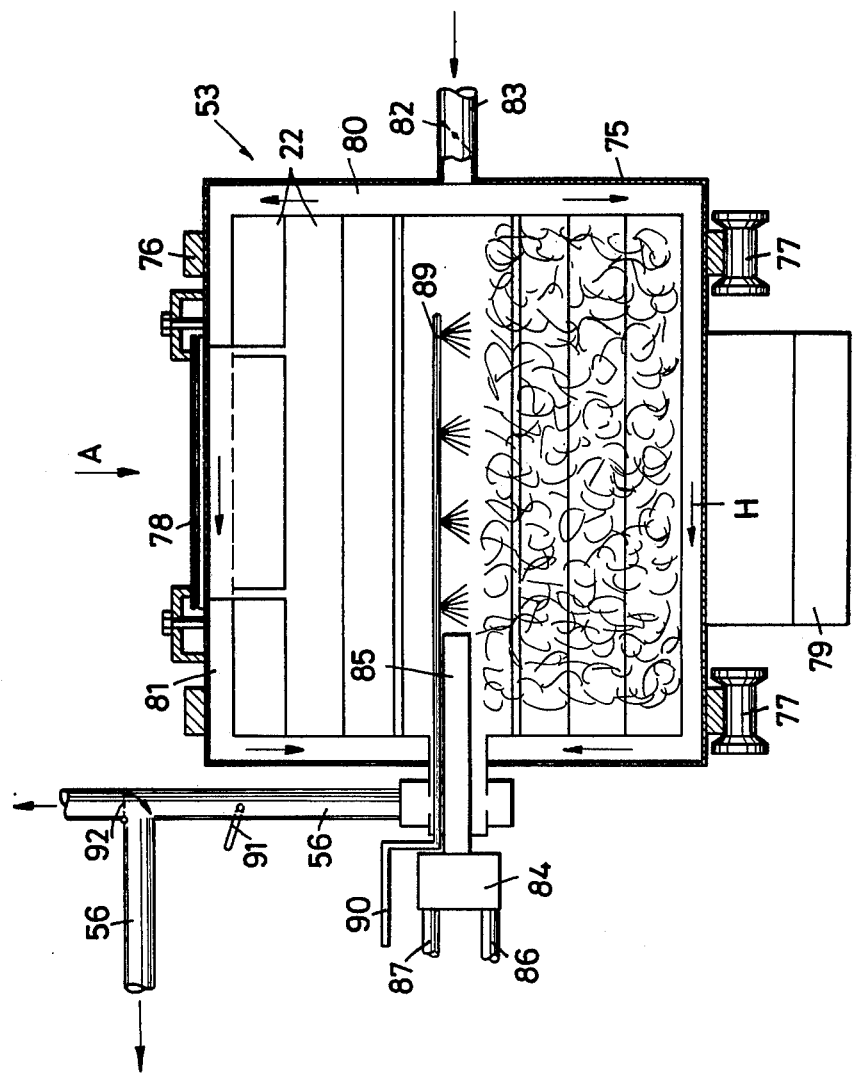
FIG. 3 is a longitudinal section through a low-temperature carbonization reactor constructed as a rotary drum.

FIG. 3 is a longitudinal section of one of the low-temperature carbonization reactors 53 of the plant. The reactor comprises a rotary drum 75 mounted on supporting and drive rollers 77 via races 76. The outer periphery of the rotary drum has an aperture which is adapted to be firmly closed by a fixed cover 78 and through which the charge is introduced from the bunker 51 in the direction of arrow A and is discharged into a bottom trough 79 on completion of the low-temperature carbonization process. The inner shell of the rotary drum is provided with flow ducts 80, 81 connected via a valve 82 to a hot-gas pipe 83 for indirect heating of the low-temperature carbonization material. After flowing through the heating ducts 81, the gases which have cooled as a result and which may, for example, be the exhaust gases of an internal combustion engine disposed downstream of the combustible gas reactor, are withdrawn from the low-temperature carbonization gas reactor 53.

A central burner 85 is disposed on one end wall of the rotary drum and its mixing chamber 84 receives preheated fresh air via pipe 86 and combustible gas from reactor 58 via pipe 87. One or more spray tubes 89 also extend into the interior of the rotary drum 53 to enable the charge to be sprayed with water vapour or vapour fed via a pipe 90 in order to control the low-temperature carbonization process. The discharge pipe 56 for the low-temperature carbonization gases contains one or more temperature sensors 91 which detect the low-temperature carbonization gas temperatures and actuate valves (not all shown) in the pipes 83, 86, 87, 90 so that the carbonization temperature can be kept in the required optimum range of about 500° C., depending on the nature of the charge. The charge, i.e. the material for low-temperature carbonization, is turned over continuously by driver plates 22 as the rotary drum rotates, and is heated through in a short time as a result. As soon as low-temperature carbonization starts, a positive pressure forms inside the rotary tubes 53 and the low-temperature carbonization gas flows into the pipe 56 via a sleeve which slides in sealing-tight relationship. The heat supply from the exhaust gases of a connected gas engine can be so controlled by the valve 82 that the amount of low-temperature carbonization gases forming is only the amount required for the downstream gas engine at the required load.

Figure 4:
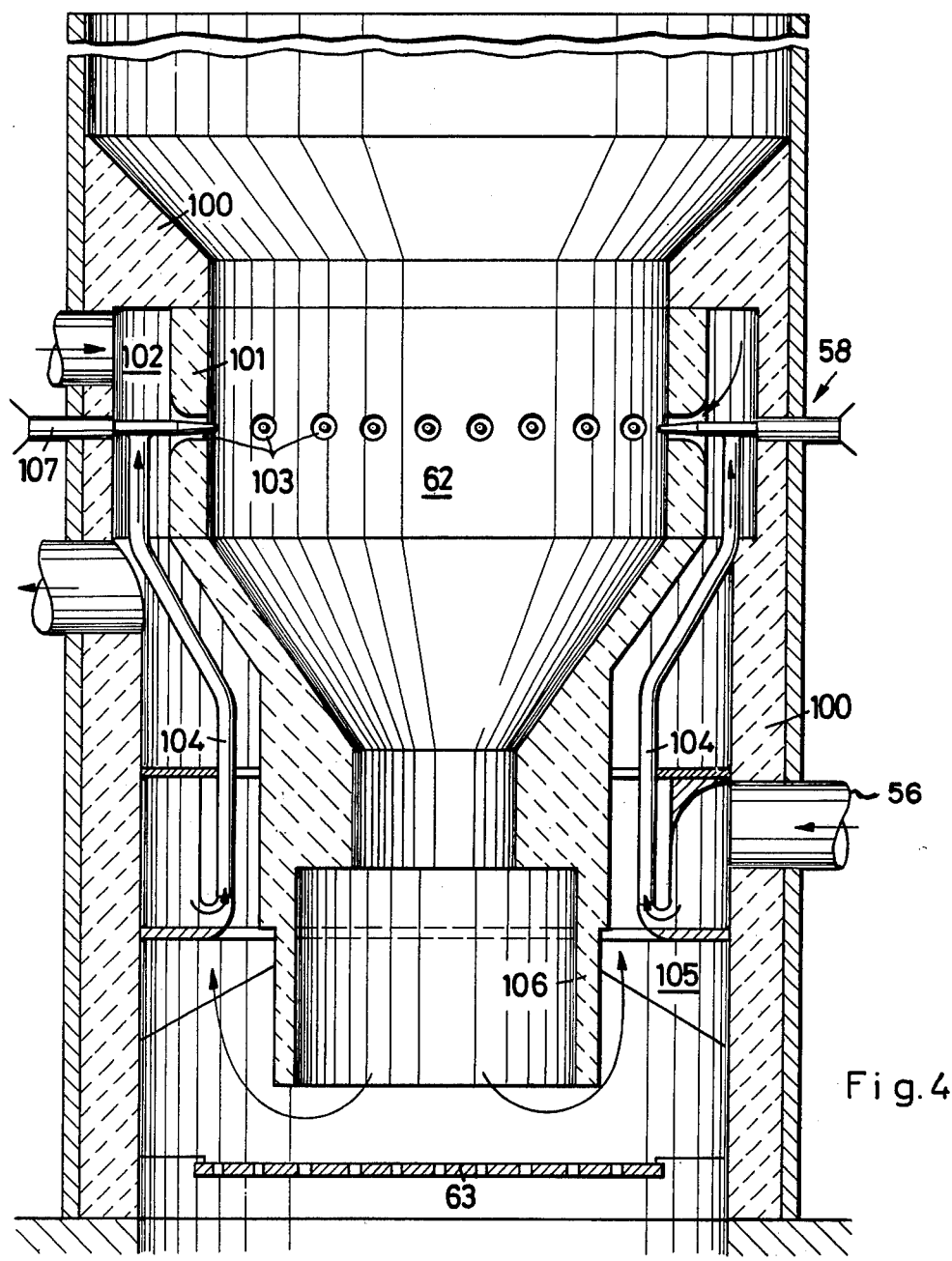
FIG. 4 is an enlarged scale view of the reaction zone of the combustible gas reactor.

In the embodiment which is shown in vertical section in FIG. 4 and which is slightly modified in respect of the pipes as compared with the reactors shown in FIGS. 1 and 2, the zone bounded by conically tapering refractory walls 100 contains the hot reaction zone 62. An annular duct 102 is provided radially outside this reaction zone and is separated from the latter by a refractory annular wall 101 and is connected to the low-temperature carbonization gas pipe 56. For the purposes of introducing the low-temperature carbonization gases into the hot reaction zone, the refractory annular wall 101 contains a plurality of radial apertures 103 in which fresh-air pipes 104 terminate.

The bottom part of the reactor is further constricted by a conical construction of the refractory wall 101 and bounds an outer annular chamber 105 through which the hot combustible gas generated in the reactor is discharged via the pipe 66. The fresh-air pipes 104 leading to the injection apertures 103 also extend in this annular chamber so that the fresh air is preheated by the combustible gas at a temperature of about 450° to 500° C. The bottom end of the conically stepped annular wall 101 has a cylindrically enlarged tubular part 106 intended to prevent ash particles from being entrained by the discharged combustible gas. Starting burners 107 lead into the orifices of the fresh-air pipes 104 and can be fed with solid, liquid or gaseous fuels and are intended to heat the reaction zone 62.

DESCRIPTION OF PREFERRED EMBODIMENTS

The plant described in connection with FIGS. 2 to 4 operates as follows: The charge in the form of pieces which may or may not have been predried passes from the bunker 51 via the outlets 52 into the reactors 53. The latter are connected in parallel and can be connected to the combustible gas pipe 87 or to the low-temperature carbonization gas discharge pipe 56 as the low-temperature carbonization process takes place. In addition to indirect waste gas heating, additional heat supply may be obtained by starting the central burner in order to heat the rotary drum and/or effect low-temperature carbonization of materials for which the heat liberated during the low-temperature carbonization process is not sufficient to achieve and maintain the low-temperature carbonization temperature of about 500° C. The combustion process in this burner is to be stoichiometric, the quantities of heat supplied being controlled by the temperatures of the low-temperature carbonization gases.

For continuous operation without excessive fluctuations in the gas composition it is advantageous to provide a plurality of rotary drums connected in parallel. Each rotary drum is operated intermittently, the residues being emptied from the drum which is refilled with the charge from the bunker on conclusion of the low-temperature carbonization process. Residual drying is carried out before the actual latter process starts and the surplus water vapour liberated in these conditions can be discharged by actuating a valve 92 (FIG. 3). On completion of the drying operation, the temperature rapidly rises to the range of about 500° C. selected according to the invention, as the low-temperature carbonization process starts. If the latter process precedes too vigorously owing to the highly exothermic reactions and if the quantities of low-temperature carbonization gas produced exceed the amounts of such gas required by the load, then it may not be possible to maintain the required low-temperature carbonization conditions by interrupting the external indirect heat supply, i.e. by shutting off the burner 84 and closing the central duct 83. Water or water vapour is sprayed on to the material undergoing the process, in order to reduce the temperature. This procedure may also be advisable to convert the low-temperature carbonisation coke into a gas. In the case of endothermic low-temperature carbonization, additional heat can be supplied directly not only during the starting stage but also continuously by means of burner 84.

The low-temperature carbonization gases produced flow at a temperature of about 500° C. into the cyclone 57, which is designed for high-temperature operation and in which soot, flue dust etc. are separated and discharged. In the embodiment shown in FIG. 2, the dust-free hot low-temperature carbonization gases flow on into an annular mixing chamber in which they are mixed with the fresh air supplied through the spiral pipe 68 and from which they are injected into the hot reaction zone of the combustible gas reactor 58 via the nozzle apertures 66.

Reactor 58 is charged with a low-ash solid carbon vehicle, for example wood, wood charcoal, certain types of lignite, peat or the like. The carbon vehicle should have only small ash content, and the softening point of the ash must be above 1200° C. in order reliably to prevent the reactor from being clogged in the region of the hot reaction zone.

The combustible gases which have been produced from the low-temperature carbonization gases in the red-hot reaction zone with the participation of the injected fresh air and the carbon vehicle flow round the low-temperature carbonization gas and fresh air mixture pipes in the chamber 65 and the fresh-air pipes in the annular duct 105 and in so doing give up a considerable part of their entrained heat, and this has an extremely favourable effect on the heat balance of the overall plant. The sensible heat contained in the generated combustible gas can be further utilised for predrying or heating the low-temperature carbonization reactors.

To ensure the minimum possible loss of calorific value of the charge, i.e., to ensure that there is the maximum amount of heat energy contained in the combustible gas after gasification, good thermal insulation should be provided for the rotary tubes, exhaust pipe, sleeve, pipe, cyclone and gasification reactor in respect of heat losses to the outside.

In terms of process engineering it is very advantageous if a water bath is provided in the gasification reactor beneath the grate for the reaction bed because it provides automatic extinction of the ash. To ensure a continuous process the grate may be replaced by a cone along the inclined walls of which the ash slides into the water bath.

The process according to the invention has also proved very advantageous for the low-temperature carbonization of liquid fuels, for example crude oils, used oils and petroleum processing residues which, because of their high sulphur contents or other pollutant constituents, could not hither to be burned, or else could be burned only if the resulting waste gases were subjected to considerable purification. More particularly, the process according to the invention can be used in complex drive units in which the high-energy combustible gas generated is converted directly into mechanical work in an internal combustion piston engine or a gas turbine, or electrical current by way of a generator. For example, it is possible to use the process according to the invention in conjunction with gas turbines in tankers and to gasify in a plant according to the invention the petroleum otherwise not directly usable for propulsion. Since the composition of petroleum varies only within comparatively narrow limits as compared with, say, industrial refuse, and its heat content is very high, the dimensions of the low-temperature carbonization and gasification reactors can be reduced considerably as compared with the plant shown in the drawing. In order further to improve the energy balance and, possibly, intensify the reactions, the entire low-temperature carbonization and gas generating process in such plants may be carried out at positive or negative pressure, the value of which is determined by the load using the combustible gas, which is then highly expanded, or depending upon the throughput of the gases through the various parts of the plant according to the invention.

The apparatus according to the invention can be modified according to requirements as determined by different charge materials. For example, a continuously charged rotary tube or shaft units can be used instead of the intermittently operated low-temperature carbonization reactors in the form of rotary drums.

I claim:

1. Apparatus for the production of combustible gas from waste materials and other combustible materials which comprises:
   at least one low-temperature carbonization reactor comprising
   a thermally insulated rotary tube,
   means to rotate said rotary tube,
   a covered aperture on said rotary tube for introduction of waste materials charge and for discharge of carbonized solids,
   inlet means for introduction of gas into said rotary tube, and
   outlet means for low-temperature carbonization gases formed in said carbonization reactor;
   means to receive carbonized solids discharged from said carbonization reactor;
   a gasification reactor comprising
   a reactor bed,
   pipes that lead laterally into said reactor bed to supply preheated air thereto,
   inlet means for introducing low-temperature carbonization gases obtained from said carbonization reactor,
   outlet means at the bottom of said reaction bed for removing combustible gas formed in said gasification reactor, and
   a grate for discharge of ash formed in said reaction bed;
   a conveyor beneath said grate to handle ash discharged through said grate; and
   conduit means connecting said carbonization reactor outlet means to said gasification reactor inlet means for flow of said carbonization gases therethrough.

2. Apparatus according to claim 1 wherein said gasification reactor inlet means leads directly into the region of said reactor bed, and said conduit means comprises a dust extraction device.

3. Apparatus according to claim 2 wherein there are a plurality of said low-temperature carbonization reactors that are connected by a common conduit means to a single gasification reactor.

4. Apparatus according to claim 3 wherein said carbonization reactors comprise:
an annular chamber through which heating gases flow,
at least one burner arranged to heat the interior of said carbonization reactors,
a spray tube for spraying a charge contained in said carbonization reactors with water or steam,
control valves for said heating gases and for said spray tube, and
means to control said valves dependent upon the temperature existing in said carbonization reactor.

5. Apparatus according to claim 1 wherein said inlet means of said gasification reactor comprises a plurality of gas pipes that lead laterally into the side of said reactor bed.

6. Apparatus according to claim 1 wherein said gasification reactor has an annular space surrounding said reactor bed, said gasification reactor inlet means introduces carbonization gases directly into said annular space and there are a plurality of radial passages radiating inwardly of said annular space into said reactor bed whereby at least a portion of carbonization gases derived from said carbonization reactor and introduced into said annular space flow into said reactor bed through said radial passages.

7. The apparatus of claim 6 wherein nozzles extend axially into said reactor bed through said radial passages for injection of fresh air into said reactor bed, said nozzles being joined for air flow to tubes that pass in part through said annular space whereby air flowing in said tubes will be heated by heat exchange with gas flowing in said annular space.

8. The apparatus of claim 1 wherein said reactor bed of the gasification reactor is surrounded by annular space into which combustible gas passes upon discharge from said reactor bed.

9. The apparatus of claim 1 comprises an internal combustion engine having a fuel intake and an exhaust gas outlet, said fuel intake is connected to said gasification reactor for flow of combustible gas therefrom to said combustion engine and said exhaust gas outlet is connected to said carbonization reactor for recycle of exhaust gas from the engine into the carbonization reactor.

10. The apparatus of claim 1 wherein said carbonization reactor comprises perpherial flow ducts through which hot gases may pass for indirect heating of low temperature carbonization material contained in said carbonization reactor.

* * * * *